(12) United States Patent
Parks et al.

(10) Patent No.: US 10,328,758 B2
(45) Date of Patent: Jun. 25, 2019

(54) ANHYDROUS AMMONIA TRAILER HITCH

(71) Applicants: Kevin C. Parks, Lucas, KS (US); John Froese, Garden City, KS (US)

(72) Inventors: Kevin C. Parks, Lucas, KS (US); John Froese, Garden City, KS (US)

( * ) Notice: Subject to any disclaimer, the term of this patent is extended or adjusted under 35 U.S.C. 154(b) by 119 days.

(21) Appl. No.: 15/685,998

(22) Filed: Aug. 24, 2017

(65) Prior Publication Data
US 2017/0349014 A1 Dec. 7, 2017

(51) Int. Cl.
| | |
|---|---|
| *B60D 1/24* | (2006.01) |
| *B60D 1/02* | (2006.01) |
| *A01C 23/00* | (2006.01) |
| *B60D 1/18* | (2006.01) |
| *B60D 1/26* | (2006.01) |
| *A01C 23/02* | (2006.01) |

(52) U.S. Cl.
CPC ............ *B60D 1/246* (2013.01); *A01C 23/008* (2013.01); *B60D 1/02* (2013.01); *B60D 1/18* (2013.01); *B60D 1/187* (2013.01); *B60D 1/243* (2013.01); *B60D 1/26* (2013.01); *A01C 23/024* (2013.01)

(58) Field of Classification Search
CPC . B60D 1/26; B60D 1/246; B60D 1/02; B60D 1/025; B60D 1/187
See application file for complete search history.

(56) References Cited

U.S. PATENT DOCUMENTS

| | | | | |
|---|---|---|---|---|
| 3,889,979 | A * | 6/1975 | Schmiesing | A01B 59/042 172/272 |
| 4,431,207 | A * | 2/1984 | Langenfeld | B60D 1/02 172/248 |
| 5,286,050 | A * | 2/1994 | Stallings, Jr. | B60D 1/02 172/272 |
| 8,920,102 | B2 * | 12/2014 | Cullum | B60D 1/14 414/563 |

* cited by examiner

*Primary Examiner* — Kevin Hurley
(74) *Attorney, Agent, or Firm* — Kenneth H. Jack; Davis & Jack, L.L.C.

(57) ABSTRACT

An anhydrous ammonia trailer hitch incorporating a base; a vehicle mounting receiver hitch fixedly attached to and extending forwardly from the base; a bolt mounted to the base, the bolt being adapted for moving between latching and releasing positions; a release plate having a first eye fitted for receiving the bolt, the bolt extending into the eye upon movement to the latching position; a remotely actuatable linear motion actuator connected operatively to the bolt for moving the bolt between the latching and releasing position; a tongue mount fixedly attached to the release plate; and at least a first safety chain mount fixedly attached to the release plate.

15 Claims, 6 Drawing Sheets

ANHYDROUS AMMONIA TRAILER HITCH

FIELD OF THE INVENTION

This invention relates to anhydrous ammonia trailers of the type utilized for agricultural fertilizing purposes. More particularly, this invention relates to apparatus adapted for interconnecting such anhydrous ammonia trailers to a towing vehicle or a wheeled agricultural implement.

BACKGROUND OF THE INVENTION

Towed trailers are commonly subject to rollover accidents which, upon occurrence, may exert extreme torsional forces to the coupling linkage between the trailer and a towing vehicle. Such torsional forces commonly break the linkage, allowing the towed trailer to travel over ground and roadway surfaces independently from and in directions different than the towing vehicle. Incidents of such independent and differently directed trailer travel occurring upon a rollover accident may threaten severe property damage, personal injuries, or fatalities. In order to reduce such risks, flexible safety chains or cables are commonly provided as a backup which further interconnects the trailer and the towing vehicle. In the event of a trailer rollover accident, the flexible backup chains spanning between the trailer and the vehicle are able to violently twist without breaking. The conventionally provided backup safety chains desirably maintain a secure connection between the towing vehicle and its trailer until both vehicles are able to come to a stop.

Where the towed trailer constitutes a wheeled anhydrous ammonia tank trailer (which is a subject of the instant invention), toppling and rollover accidents are, as with any trailer, a threat. Accordingly, it remains desirable to equip anhydrous ammonia trailers with safety chains. However, unlike conventional trailers, anhydrous ammonia trailers include a high pressure anhydrous ammonia hose which typically extends forwardly to a forwardly positioned tractor towed fertilizer applicator. Torsional forces experienced during an anhydrous ammonia trailer rollover accident may, in addition to breaking the trailer tongue linkage, break such anhydrous ammonia supply hose, resulting in a violent ejection of anhydrous ammonia vapor and gas.

In the event of such dual breakage of a tow tongue linkage and an anhydrous ammonia supply hose, the trailer's backup safety chains may undesirably fixedly hold the tow vehicle at the vicinity of a potentially lethal expanding cloud of anhydrous ammonia gas. Safety chain holding of the tow vehicle at such location and vicinity may undesirably result in serious gas poisoning or death of the operator of the towing vehicle. In such circumstances, the conventionally used and conventionally needed trailer safety chains are undesirably transformed into a factor causing injury or death.

The instant inventive anhydrous ammonia trailer hitch solves or ameliorates the problems and deficiencies described above by specially configuring an anhydrous ammonia trailer hitch to include a linear motion actuator which operatively engages a bolt, which may alternatively retain and release a specially configured release plate component.

BRIEF SUMMARY OF THE INVENTION

The instant invention is intended for use in towing an agricultural anhydrous ammonia trailer of the type including a fifth wheel chassis, four ground rolling wheels, and an upwardly mounted high capacity tank of agricultural anhydrous ammonia, $NH_3$. Agricultural ammonia is utilized as a soil nitrogen enhancing fertilizer, and inhalation of anhydrous ammonia may result in catastrophic lung tissue damage and death. The instant inventive anhydrous ammonia trailer hitch is intended to be protective of such injuries, while continuing to provide conventional modes of vehicle trailering safety.

A first structural component of the instant inventive anhydrous ammonia trailer hitch comprises a rigid base. In a preferred embodiment, the base component comprises a rectangular steel plate having forward and rearward faces. According to the orientation of the instant invention, the forward direction is typically understood as being toward towing vehicles, typically comprising a tractor which tows a wheeled fertilizer applicator in train with the anhydrous ammonia trailer. The rearward direction of the instant invention is understood as being toward a towed rearmost anhydrous ammonia trailer and toward a connecting trailer tongue which extends forwardly to join with the inventive hitch.

A further structural component of the instant inventive hitch comprises vehicle mounting means which are fixedly attached to and extend forwardly from the base component. In a preferred embodiment, the vehicle mounting means comprise a pin half of a pin and socket joint of a type which is commonly described as a receiver hitch. Other vehicle mounting means such as a clamping bracket which engages a chassis member of an immediately forwardly positioned fertilizer applicator may be provided.

A further structural component of the instant inventive hitch comprises a bolt which is mounted to and is operatively connected with the base. In the preferred embodiment, the bolt and its associated connecting structures are adapted for operatively moving the bolt between a latching position and releasing position. In a preferred embodiment, the invention's bolt component comprises a distal end of an alternatively telescopable and retractable shaft.

A further structural component of the instant inventive hitch comprises a release plate having a first eye which is fitted for receiving and engaging with the bolt component. Upon the bolt's movement to its latching position, the bolt preferably enters and engages the first eye. At its latching position, the bolt resists movements of the release plate away from the bolt and away from the base.

A further structural component of the instant inventive anhydrous ammonia trailer hitch comprises a remotely actuatable linear motion actuator. In a preferred embodiment, such actuator comprises a cylinder and piston combination whose piston is fixedly attached to a proximal end of the preferably provided telescoping shaft. Suitably, the remotely actuatable linear motion actuator may alternatively comprise an electric over hydraulic actuator, electric motor driven jack screw actuator, an electric motor driven ball screw actuator, a rack and pinion actuator whose pinion component is electric motor driven, or a heavy duty electric solenoid. Where the linear motion actuator component comprises, as is preferred, a piston and cylinder combination, remote actuation may be provided via hydraulic or pneumatic lines which extend forwardly for valve controlled operation with an operator's cab. Where the linear motion actuator is electric motor driven, insulated conductors for powering and on/off switching of such motor may alternatively extend forwardly for switched operation within the tow vehicle's cab.

A further structural component of the instant inventive hitch comprises a tongue mount which is fixedly attached to the release plate component, preferably at a rearward aspect of such plate. In a preferred embodiment, the tongue mount comprises a tang half of a tang and clevis joint. In a preferred embodiment, the clevis half of such joint is presented at the forward end of the tow tongue of an anhydrous ammonia trailer. Other suitably substituted tongue mounts comprise a hook half or eye half of a hook and eye trailer hitch, or a common ball receiver trailer hitch.

Further structural components of the instant inventive trailer hitch comprise at least a first, and preferably a pair of or right and left safety chain mounts. Such chain mounts are preferably exclusively fixedly attached to or wholly formed with the release plate component.

During trailer towing use of the instant inventive anhydrous ammonia trailer hitch, a trailer toppling accident may occur. For example, the rightward wheels of the towed anhydrous ammonia trailer may accidentally fall rightwardly from a ledge or precipice, resulting in rightward toppling of the trailer. In such event, the connection of the invention's tongue mount to the trailer's tongue may break, threatening to free the trailer from the forward towing vehicles. In such event, the trailer's safety chains which are attached to the release plate's chain mounts may maintain a secure connection between the trailer and the forward towing vehicles, advantageously preventing the overturned trailer from moving in an uncontrolled fashion downslope and away from the tow vehicle.

In the further event that the toppling and twisting forces experienced by the trailer during such accident tear away the ammonia supply line, pressurized ejection of $NH_3$ gas may occur simultaneously with breakage of the trailer's main towing linkage. Upon such simultaneous breakage, the operator of the trailer's tow vehicle may easily and conveniently actuate the invention's remotely actuatable linear motion actuator component to retract the bolt component to its plate releasing position. Upon such bolt actuation, the release plate component along with its safety chain attachments may freely slide away from the base component, allowing the towing vehicle to be driven forwardly with no connection with the trailer. Such remotely actuated disconnect function advantageously allows the operator to utilize the tow vehicle as means for transportation and escape from an expanding cloud of deadly anhydrous ammonia.

Accordingly, objects of the instant invention include the provision of an anhydrous ammonia trailer hitch which incorporates structures as described above, and which arranges those structures in relation to each other, in manners described above for the performance of beneficial functions as described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
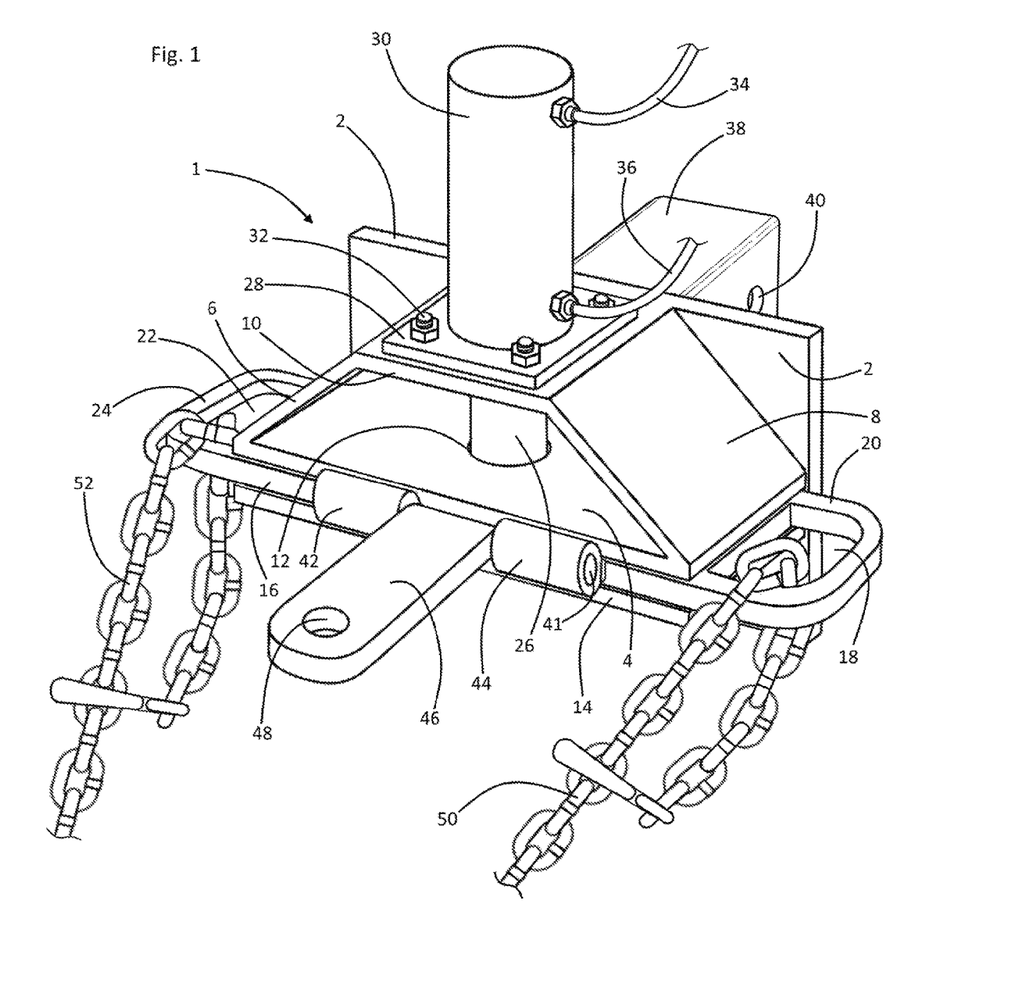
FIG. 1 is a perspective view of a preferred embodiment of the instant inventive anhydrous ammonia trailer hitch.
Figure 2:
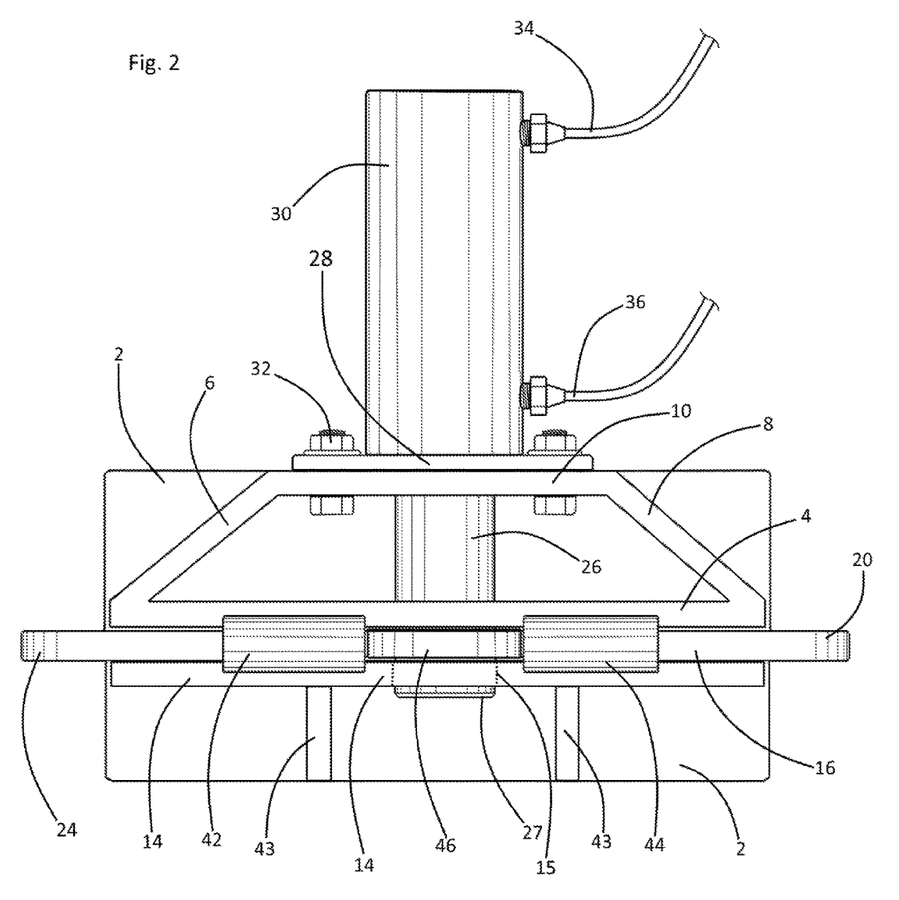
FIG. 2 is a front view of the hitch of FIG. 1.
Figure 3:
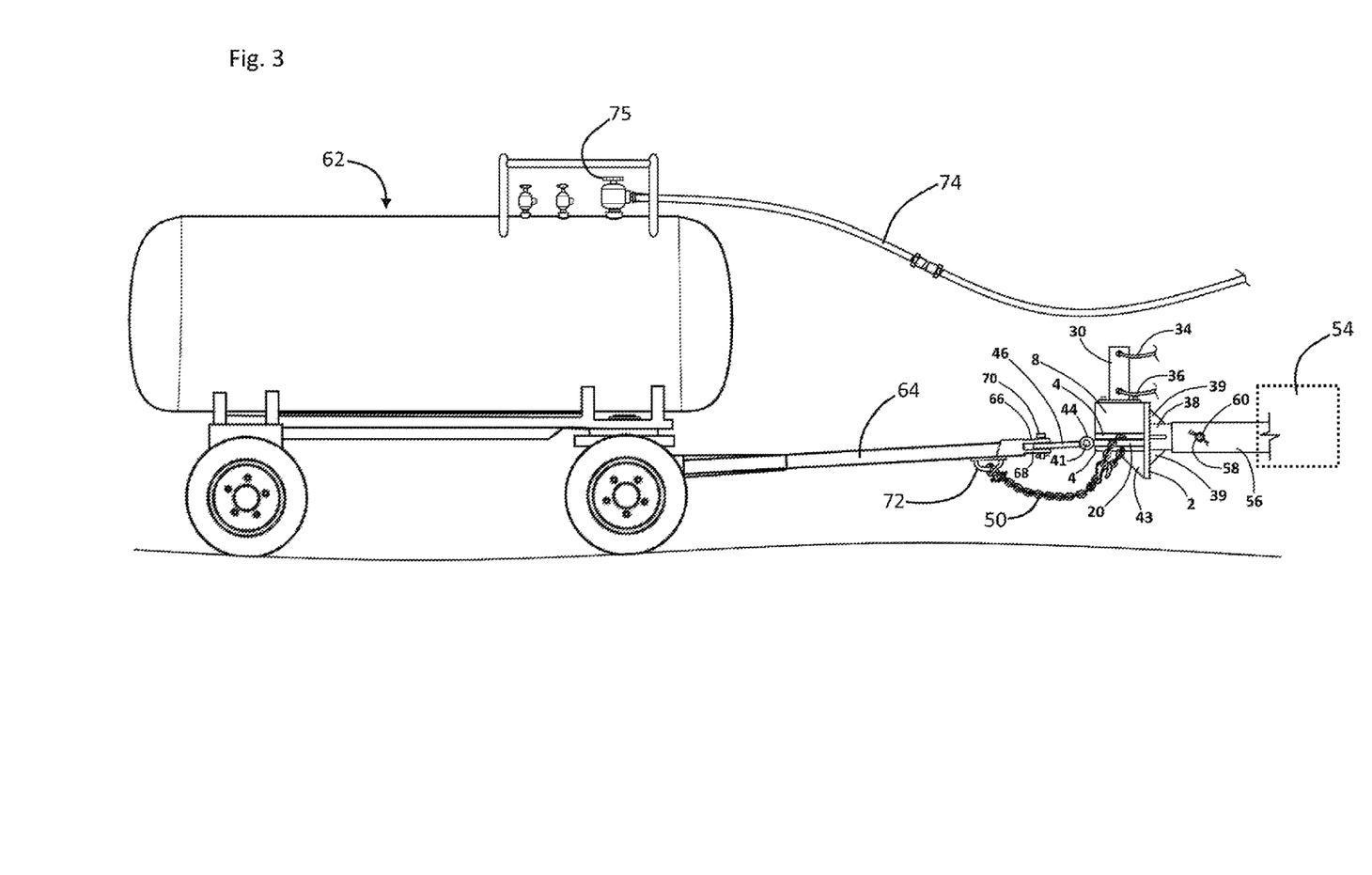
FIG. 3 shows an anhydrous ammonia tank trailer attached to the instant inventive hitch, the hitch being shown in side view.

Referring now to the drawings, and in particular to Drawing FIGS. 1-3, a preferred embodiment of the instant inventive anhydrous ammonia trailer hitch is referred to generally by Reference Arrow 1. The hitch 1 comprises a base 2 which preferably is configured as a vertically oriented steel plate having front and rear faces. In the view of FIG. 1, the rear face of base 2 is oriented toward the viewer.

Figure 5:
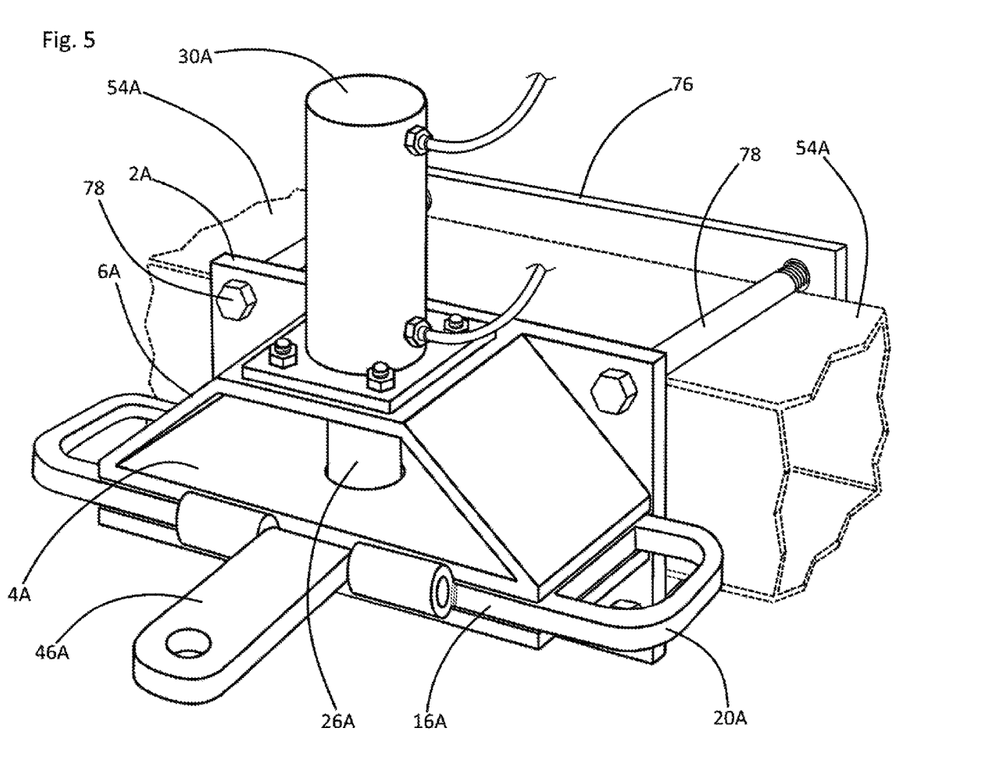
FIG. 5 presents an alternate configuration of the structure depicted in FIG. 1.
Figure 6:
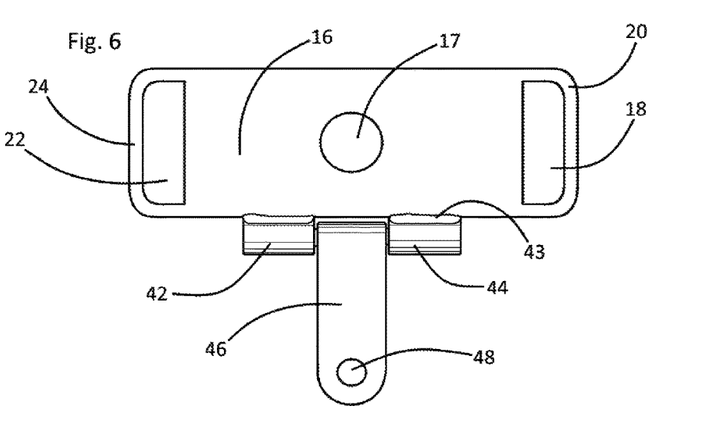
FIG. 6 is a plan view of the instant invention's releasable component.

Tow vehicle mounting means are preferably fixedly attached to and extend forwardly from the forward face of the base 2. In a preferred embodiment, the tow vehicle mounting means component comprise a pin half 38 of a trailer towing pin and socket joint, such joint being commonly referred to as a receiver hitch. Referring to FIG. 3, the socket half of such pin and socket joint may comprise a hollow bored receiver 56, such bore opening rearwardly and receiving a forward extension of the forward end of pin 38. To secure pin 38 within receiver 56, laterally alignable eyes 40 and 58 may be provided, and a double sheer slide pin 60 may be extended laterally therethrough. The pin and socket joint 38,56 of FIGS. 1 and 3 is intended as being representative of a reverse configuration of such joint (not depicted within views) in which a socket half of the joint extends forwardly from the base 2. Where the vehicle mounting means comprise such receiver hitch type pin and socket joint, triangulating gussets 39 are preferably provided to assure a rigid and durable cantilevering extension of the pin 38 from the base 2. Referring further simultaneously to FIG. 5, the invention's tow vehicle mounting means component may alternatively comprise a clamping bracket assembly including a second forwardly positioned plate 56 which may rearwardly bias against and grasp a rearward chassis member 54A of a towed implement such as an agricultural fertilizer applicator.

In FIG. 5's tow vehicle mounting means alternative, helically threaded bolts 78 securely attach the invention's rearward hitch components to the chassis member 54A. All structures appearing in FIG. 5 which are identified by a reference numeral having the suffix "A" are substantially identical to similarly numbered structures which appear in FIGS. 1-4 and 6.

A further structural component of the instant inventive hitch comprises a bolt 26 which is securely and movably mounted to the base 2. In the preferred embodiment, the bolt component is adapted for motion between a latching position and a releasing position. While in its latching position, the bolt 26 extends downwardly through, referring simultaneously to FIGS. 2 and 6, a centrally positioned first eye 17 of a release plate 16. In the preferred embodiment, such first eye 17 is fitted for receiving the distal or lower end 27 of the bolt 26. The bolt's latching position is depicted in FIG. 3 and, as the distal end 27 of the bolt 26 moves downwardly, such distal end may enter and securely engage the at least first eye 17.

Figure 4:
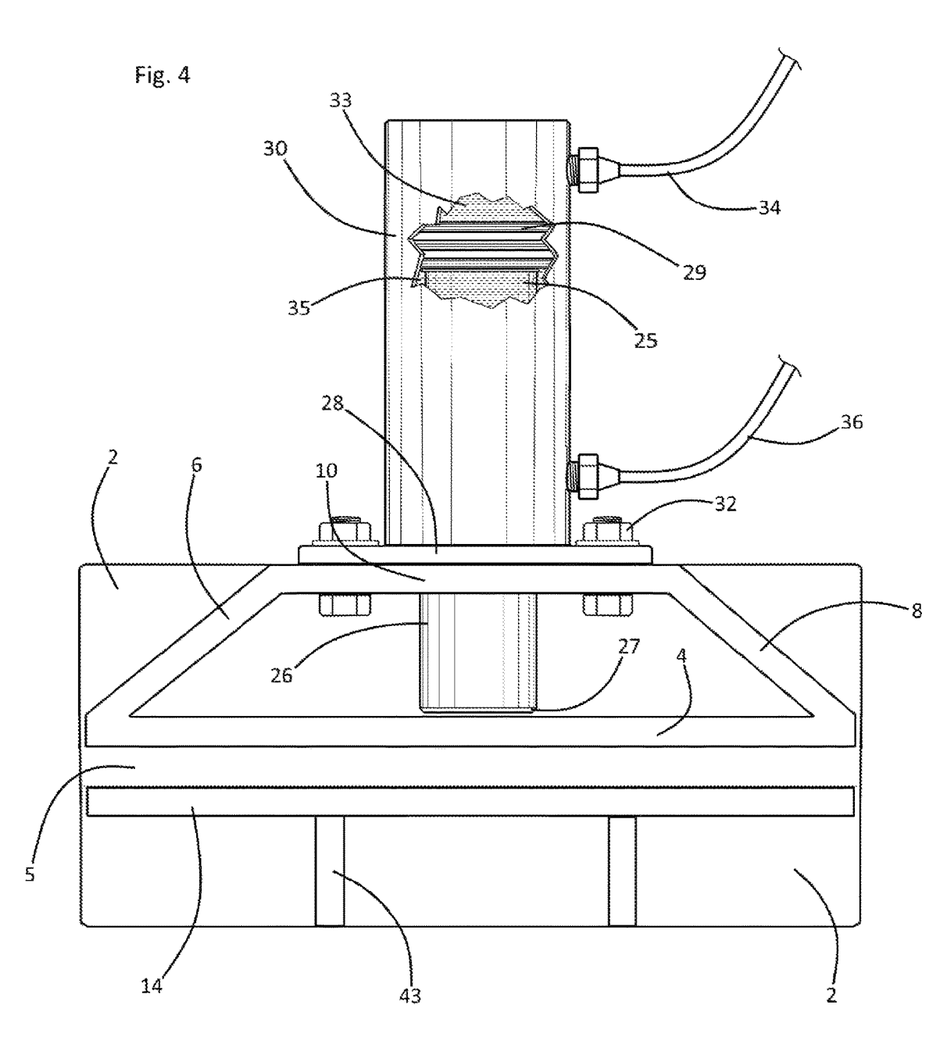
FIG. 4 presents a plate releasing configuration of the structure of FIG. 2, the view showing a releasable component removed.

The instant inventive trailer hitch preferably further comprises a remotely actuatable linear motion actuator which is connected operatively to the bolt 26 for motion between a latching position (e.g., the bolt's FIGS. 1-3 position) and a releasing position (e.g., the bolt's FIG. 4 position). In the FIGS. 1-4 embodiment, the linear motion actuator component is depicted as a two way hydraulic cylinder 30. Referring in particular to FIG. 4, such cylinder 30 has an interior sliding piston 29, an upper hydraulic fluid volume 33, a lower hydraulic fluid volume 35, an upper hydraulic pressure supply line 34, and a lower hydraulic pressure supply line 36. Valve controlled actuations of pressurized flow within lines 34 and 36 may alternatively drive piston 29 upwardly and downwardly within cylinder 30. Such hydraulic actuator alternatively telescopes and retracts the piston shaft/bolt 26 whose upper proximal end is fixedly attached to the piston 29. The depicted two way hydraulic cylinder 30 is intended as being representative of other suitably substituted remotely actuatable linear motion actuators such as electric over hydraulic actuators, pneumatic cylinders, electric motor driven jack screw actuators, electric motor driven ball screw actuators, electric motor driven rack and pinion actuators, and electric solenoid actuators.

A further structural component of the instant inventive trailer hitch 1 comprises a trailer tongue mount which is fixedly attached to the release plate 16. In a preferred embodiment, the invention's tongue mount component comprises a tang half 46 of, referring in particular to FIG. 3, a clevis and tang joint. The double eared clevis 66 and 68 of such joint is fixedly attached to and extends forwardly from the forward end of a trailer tongue 64 of a wheeled anhydrous ammonia trailer 62. The tang 46 and clevis 66,68 joint is preferably pivotally joined by a slide pin 70 which extends vertically through eyes (not depicted within views) opening at clevis ears 66 and 68, and opening through eye 48 of tang 46. The tang component 46 is preferably hingedly mounted to the release plate 16 by means of left and right hinge sleeves 42 and 44 which receive journal axles 41 extending leftwardly and rightwardly from the forward end of tang 46. The tang configured tongue mount depicted in FIGS. 1-3 is intended as being representative of other suitably substituted mounts such as a ball receiver, a hook latch, or a hook receiving eye (not depicted within views).

A further structural component of the instant inventive trailer hitch comprises at least a first safety chain mount which is fixedly attached to or formed wholly with the release plate 16. In a preferred embodiment, a pair of or right and left safety chain mounts are provided, such pair comprising a right chain receiving eye 18 and a left chain receiving eye 22. In the preferred embodiment, such eyes 18 and 22 are formed by loops 20 and 24 which extend respectively rightwardly and leftwardly from rightward and leftward aspects of the release plate 16. Also in the preferred embodiment, the loops 20 and 24 are "D" configured for additional function as convenient hand holds in assistance of manual carriage of the hitch 1.

Referring simultaneously to FIGS. 1-3, the release plate 16 may comprise a tang half of another pin and clevis joint. In the preferred embodiment, such joint has upper and lower clevis ears which are respectively configured as an upper horizontal plate 4 and a lower horizontal plate 14. Forward ends of such clevis ear plates 4 and 14 are preferably fixedly welded to the rearward face of base plate 2, and such plates/ears are preferably spaced vertically apart a distance slightly greater than the vertical thickness of the release plate 16. Such spaced positioning of the plates 4 and 14 advantageously forms and provides a rearwardly opening "U" shaped clevis space 15 into which the release plate 16 may be forwardly slidably received.

Upon a forward sliding receipt of release plate 16 within "U" space 5, as indicated in FIG. 1, the upper surface of the lower clevis ear/plate 14 advantageously functions as a shelf for slidable support of such plate. In the preferred embodiment, the upper clevis ear/plate 4 has a second eye 12 which is preferably sized similarly with eye 17 of release plate 16. The lower clevis ear/plate 14 similarly has a third eye 15 which is denoted in dotted lines upon Drawing FIG. 2.

The upper clevis ear/plate 4 preferably supports a cylinder bracket 6,8,10 for abutting support of the mounting plate 28 of cylinder 30. Helically threaded bolts 32 are preferably utilized for securely attaching such cylinder to bracket 6,8,10. In the preferred embodiment, the upper horizontal land 10 of bracket 6,8,10 is centrally apertured (not within views) for reciprocating telescoping and retracting motions of the invention's bolt/piston shaft component 26 therethrough. Triangulating gussets 43 are preferably provided for rigidly cantilevering the lower clevis ear/plate 14, while forwardly welded connections of angled bracket arms 6 and 8 rigidly cantilever the upper clevis ear/plate 4.

Referring to FIG. 3, dashed line box 54 is representative of a forwardly entrained vehicle, preferably in the nature of a wheeled agricultural fertilizer applicator. Such applicators are commonly towed by a tractor (not depicted within views) for introduction of nitrogen fertilizing $NH_3$ into the soil. Anhydrous ammonia within tank 62 is forwardly supplied via pressure hose 74 to such fertilizer applicator 54.

In use of the instant inventive trailer hitch 1, the release plate 16 may be initially slidably received within clevis space 5, and cylinder 30 may be initially operated to downwardly telescope the distal end 27 of the bolt/piston shaft 26 through the second eye 12, thence further downwardly through the first eye 17, and finally through the third eye 15 of plate 14.

Right and left safety chains 50 and 52 may be initially detached, allowing an operator to easily and conveniently carry the hitch 1 by grasping "D" loops 20 and 24 in his or her right and left hands. Thereafter, the hitch 1 may be lifted, and the vehicle mount pin 38 may be aligned with the rearward opening of receiver 56. Thereafter, pin 38 may be slidably moved within receiver 56 until eyes 40 align with eyes 58. Thereafter, a slide pin 60 may be extended laterally through such aligned eyes, securely attaching the hitch 1 to, for example, the fertilizer applicator 54.

Thereafter, the fertilizer applicator 54 may be rollably moved and positioned to an orientation at which tang 46 overlies clevis ears 66 and 68 at the forward end of tongue 64. Thereafter, the tongue 64 may be raised while the tang 46 is positioned between clevis ears 66 and 68 as indicated in FIG. 3. Thereafter, slide pin 46 may be extended downwardly through aligned eyes to fixedly and pivotally interconnect the anhydrous ammonia trailer 62 and the hitch 1.

Thereafter, as indicated in FIG. 1, safety chains 50 and 52 which are anchored to the tongue 64 via attachment loop 72 may be respectively connected to the hitch 1 by threading through the eyes 18 and 22 which are formed by the "D" loop handles 20 and 24. Referring further to FIG. 3, an anhydrous ammonia supply hose 74 extending from tank 62 may be operatively attached to the fertilizer applicator 54. Thereafter, a pressurized forward flow of $NH_3$ may be commenced via turning of valve actuator 75.

In the event the tank trailer 62 has a toppling or rollover accident, such trailer may roll laterally over the ground, and may break the connection of the tongue 64 at tang and clevis joint 46,66,68. In that event, safety chains 50 and 52 may advantageously prevent the trailer 62 from traveling over the ground in a direction different from and independently from the forward trailer towing vehicles 54. In the event that such trailer toppling accident also breaks hose 74, causing a cloud of $NH_3$ gas to spread over the ground and toward the vehicle's operator, the operator may operate the tractor's hydraulic power supply system to introduce high pressure hydraulic fluid via hydraulic line 36 into hydraulic fluid space 35. Such pressurized hydraulic fluid injection drives piston 29 upwardly and upwardly retracts the piston shaft/bolt 26. The bolt retraction simultaneously causes the distal end 27 of the bolt 26 to successively upwardly withdraw from and clear eyes 15, 17, and 12 to assume the plate releasing position depicted in FIG. 4. Such upward bolt retraction allows the release plate 16 to freely slide rearwardly out of the clevis's "U" space 5. Upon such rear sliding release, both the release plate 16 and the forward attachments of the safety chains 50 and 52 fall harmlessly to the ground while the towing tractor and towed implement 54 are driven forwardly away from and out of the growing cloud of ammonia gas.

Figure 7:
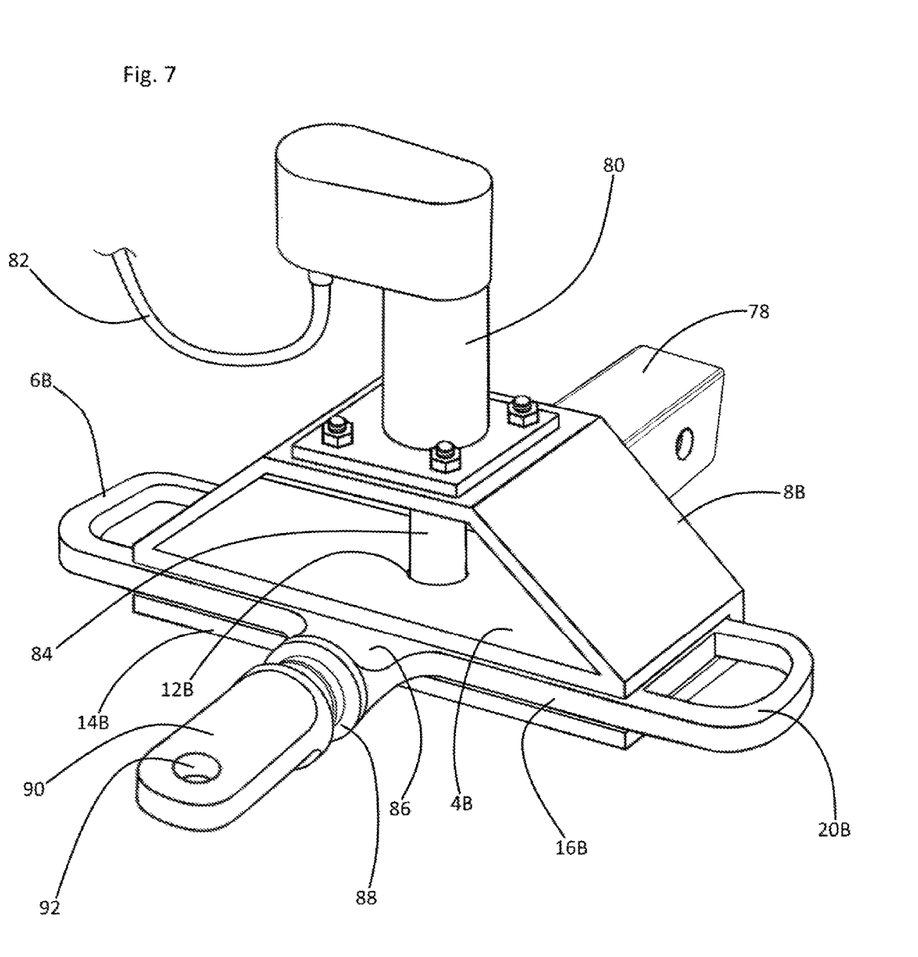
FIG. 7 presents a further alternate configuration of the structure depicted in FIG. 1.

Each structure of FIG. 7 which is identified by a reference numeral having a suffix "B" is configured substantially identically with similarly numbered structures appearing in FIG. 1. In the FIG. 7 configuration, pin 78 is sized for receipt by a receiver hitch (not depicted in views) of the type commonly installed at the rear of a heavy duty pickup truck. Due to the common absence within such trucks of a hydraulic power system, the linear motion actuator component comprises an electric motor driven jack screw actuator 80 having an extendable and retractable bolt shaft 84, and having a 12-volt electric power lead 82. Such actuator 80 may be easily actuated via a truck cab mounted switch which communicates electrically with lead 82. In the FIG. 7 configuration, the tang 90 has a solid tang base mount 86 at the rearward edge of the release plate 16B, and has a swivel joint 88 is interposed between the tang's eye 92 and the base 86. The swivel joint 88 is protective in the event a trailer rollover accident which might otherwise apply extreme torque to base 86, resulting in an upward deflection of the rear end of clevis ear/plate 4B. Such plate deflection may undesirably bind the peripheral edges of the second eye 12B against bolt 84. The low power of the electric jack screw actuator 80 (in comparison with the power of FIG. 1's hydraulic cylinder 30) may be unable to upwardly move the bolt 84 while binding at eye 12B occurs. The interposition of swivel joint 88 lessens the risk of such eye/bolt binding and lessens the risk of a release failure in the FIG. 7 configuration.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. An anhydrous ammonia trailer hitch comprising:
   (a) a base;
   (b) vehicle mounting means fixedly attached to and extending forwardly from the base;
   (c) a bolt mounted to the base, the bolt being adapted for moving between latching and releasing positions;
   (d) a release plate having a first eye fitted for receiving the bolt, the bolt engaging the first eye upon movement to the latching position;
   (e) a remotely actuatable linear motion actuator connected operatively to the bolt for moving the bolt between the latching and releasing positions;
   (f) a tongue mount fixedly attached to the release plate; and
   (g) at least a first safety chain mount fixedly attached to the release plate.

2. The anhydrous ammonia trailer hitch of claim 1 wherein the vehicle mounting means comprise a frame engaging bracket or a half of a pin and socket joint.

3. The anhydrous ammonia trailer hitch of claim 1 wherein the remotely actuatable linear motion actuator comprises a telescoping shaft.

4. The anhydrous ammonia trailer hitch of claim 3 wherein the bolt comprises a distal end of the telescoping shaft.

5. The anhydrous ammonia trailer hitch of claim 4 wherein the remotely actuatable linear motion actuator comprises a cylinder having a piston connected operatively to a proximal end of the telescoping shaft.

6. The anhydrous ammonia trailer hitch of claim 5 wherein the tongue mount comprises a half of a tang and clevis joint.

7. The anhydrous ammonia trailer hitch of claim 2 wherein the at least first safety chain mount comprises a first safety chain receiving eye.

8. The anhydrous ammonia trailer hitch of claim 7 wherein the release plate has right and left ends, and further comprising a second safety chain receiving eye, the first and second safety chain receiving eyes being respectively positioned at right and left ends of the release plate.

9. The anhydrous ammonia trailer hitch of claim 8 wherein each safety chain receiving eye is configured as a carry handle.

10. The anhydrous ammonia trailer hitch of claim 5 wherein the release plate comprises a tang half of a tang and clevis joint, said joint's clevis being fixedly attached to and extending rearwardly from the base.

11. The anhydrous ammonia trailer hitch of claim 10 wherein the tang and clevis joint's clevis comprises a pair of ears, and further comprising a second eye, said second eye opening at one of said ears and being alignable with the release plate's first eye.

12. The anhydrous ammonia trailer hitch of claim 11 further comprising a third eye opening at the other clevis joint ear and aligning with the second eye.

13. The anhydrous ammonia trailer hitch of claim 12 wherein the cylinder comprises a two way hydraulic cylinder.

14. The anhydrous ammonia trailer hitch of claim 13 wherein the pair of clevis joint ears comprises an upper clevis joint ear, and further comprising a mounting bracket fixedly attached to and extending upwardly from said ear, the mounting bracket supporting the two way hydraulic cylinder.

15. The anhydrous ammonia trailer hitch of claim 4 wherein the tongue mount comprises a tang having a rearward eye and having a forward end fixedly attached to the release plate, and further comprising a swivel joint mounted operatively between said rearward eye and said forward end.

* * * * *